United States Patent [19]
Vaccaro et al.

[11] Patent Number: 5,175,712
[45] Date of Patent: Dec. 29, 1992

[54] UNDERWATER SOUND SOURCE WITH TIMED ACTUATOR

[75] Inventors: Mark J. Vaccaro, Westerly, R.I.; Thomas R. Stottlemyer, Mystic; William L. Konrad, Niantic, both of Conn.

[73] Assignee: The United States of America as represented by the Secretary of the Navy, Washington, D.C.

[21] Appl. No.: 892,068

[22] Filed: May 22, 1992

[51] Int. Cl.⁵ .............................................. G01V 1/06
[52] U.S. Cl. ................................... 367/145; 181/116; 441/33
[58] Field of Search ............................ 441/11, 32, 33; 367/145; 181/116, 118

[56] References Cited

U.S. PATENT DOCUMENTS

| | | | |
|---|---|---|---|
| 3,148,618 | 9/1964 | Richard | 181/116 |
| 3,530,952 | 9/1970 | Epstein et al. | 181/116 |
| 3,724,374 | 4/1973 | Somerville et al. | 181/116 |
| 3,799,094 | 3/1974 | Hill | 181/116 |
| 3,937,296 | 2/1976 | Larson | 181/118 |
| 4,975,890 | 12/1990 | Wolf et al. | 367/145 |
| 5,003,515 | 3/1991 | Will et al. | 367/145 |

*Primary Examiner*—J. Woodrow Eldred
*Attorney, Agent, or Firm*—Michael J. McGowan; Prithvi C. Lall; Michael F. Oglo

[57] ABSTRACT

An autonomous underwater acoustic charge deployment buoy that can deploy acoustic charges at preselected time periods. The device can operate away from any control vessels or structures. The device comprises a plurality of launch tubes disposed within a frame supported by an elastomeric floatation collar. An electrical control circuit is fastened to the upper surface of the frame to control acoustic charge release times. A hinged door that is held closed by a burn wire is disposed on lower end of each launch tube. Activation of the control circuit causes the burn wire to part, releasing the hinged door. When the hinged door opens, gravity causes the acoustic charge to drop from the launch tube. The device can deploy a plurality of acoustic charges at preselected times remote from control vessels or structures.

7 Claims, 2 Drawing Sheets

UNDERWATER SOUND SOURCE WITH TIMED ACTUATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to sonar sound sources and more particularly to a surface deployed buoy that generates underwater sonic impulses by releasing acoustic charges at pre-set intervals. The device is autonomous and does not require external control signals or a nearby control signal generating vessel.

(2) Description of the Prior Art

Use of underwater explosive charges to provide sonic impulses is well known in the art. Echo location, sensor testing and signalling are some of the applications requiring underwater deployment of such sonic charges. In echo location the sonic charge is used in the vicinity of hydrophones to provide an impulse for echo location of submerged geologic structures or vessels. In sensor testing applications sonic charges are released at a fixed depth and distance to determine the performance characteristics of underwater sensors. Underwater charges can also be timed to explode in a coded pattern to communicate between a subsurface craft and a hydrophone.

Submarine launched acoustic charge release devices are often deployed for covertly signalling surface craft. The device used in covert signalling must be launched from a torpedo tube and provide coded release of signal charges. The device should not be visible from the surface. In one prior art device exploding bolts are used to separate the charge containing portion of the device from the control portion of the device. Charges are ejected in a coded sequence by explosive bolts in the charge containing portion of the device. A drogue is deployed from the control portion of the device to control the release of charges and prevent the ejection charge from damaging the control portion.

Aircraft deployed acoustic charge release devices are typically used in echo location applications. In this use, the explosion of a charge provides a sound source, and a sonobuoy dropped from the airplane act as pickup devices for echo location of submarines and underwater objects. Aircraft deployed devices are designed to release an underwater charge from a device containing a plurality of charges in response to a radio signal. The aircraft deployed device releases charges arrayed on a streamer to allow detonation when the buoy is signalled.

In test applications, charges are often deployed in the vicinity of an array of submarine acoustic sensors. Acoustic charges must be pressure sensitive to explode at a pre-set depth and the charges must be deployed within a standard distance from the array. The United States Navy has standard acoustic charges, known as signal underwater sound (SUS) charges, available for use in this application. If a surface vessel is used to deploy the charges, after deployment of a charge the vessel must be moved away from the charge deployment site to avoid interference with the acoustic signal because of echo from the hull or engine noise.

Each of the above methods of underwater acoustic charge deployment is deficient when deploying acoustic charges for test purposes. When testing acoustic sensors, charges must be released near the sensor with consistency. Neither aircraft nor submarines can release an acoustic source with sufficient accuracy for test purposes. Existing submarine and aircraft acoustic source devices do not allow for depth sensitive charges. Furthermore, aircraft and submarine deployment is too expensive to be practical for test purposes. Releasing acoustic charges from surface vessels is unavailable because of echo caused by the presence of the vessel and engine noise.

SUMMARY OF THE INVENTION

Accordingly, it is a general purpose and object of the present invention to provide a device for deploying acoustic charges.

It is a further object that such device be deployable from a surface vessel.

Another object is that such device release said acoustic charges at pre-set depths with consistent proximity to a sensor array.

Yet another object is that such device release said explosive charges at pre-set timed intervals to allow the deploying vessel to move away from the site of the deployment.

These objects are accomplished with the present invention by providing a buoy comprising a buoyant portion, a plurality of launch tubes storing acoustic charges (for example, a standard U.S. Navy SUS MK 59 MOD 0a acoustic charge), a timed controller, and hinged doors at the bottom of the tubes. The doors are secured with burn wires to allow the doors to open on a signal from the controller. While the buoy is aboard a surface vessel, the control means can be programmed to release the acoustic charges at selected times. The charges are pressure sensitive and will explode at a pre-selected depth. The vessel can deploy the device and leave the test area. The device releases the charges at pre-selected time intervals.

BRIEF DESCRIPTION OF THE DRAWINGS

A more complete understanding of the invention and many of the attendant advantages thereto will be readily appreciated as the invention becomes better understood by reference to the following detailed description when considered in conjunction with the accompanying drawings wherein.

DESCRIPTION OF THE PREFERRED EMBODIMENT

Figure 1:
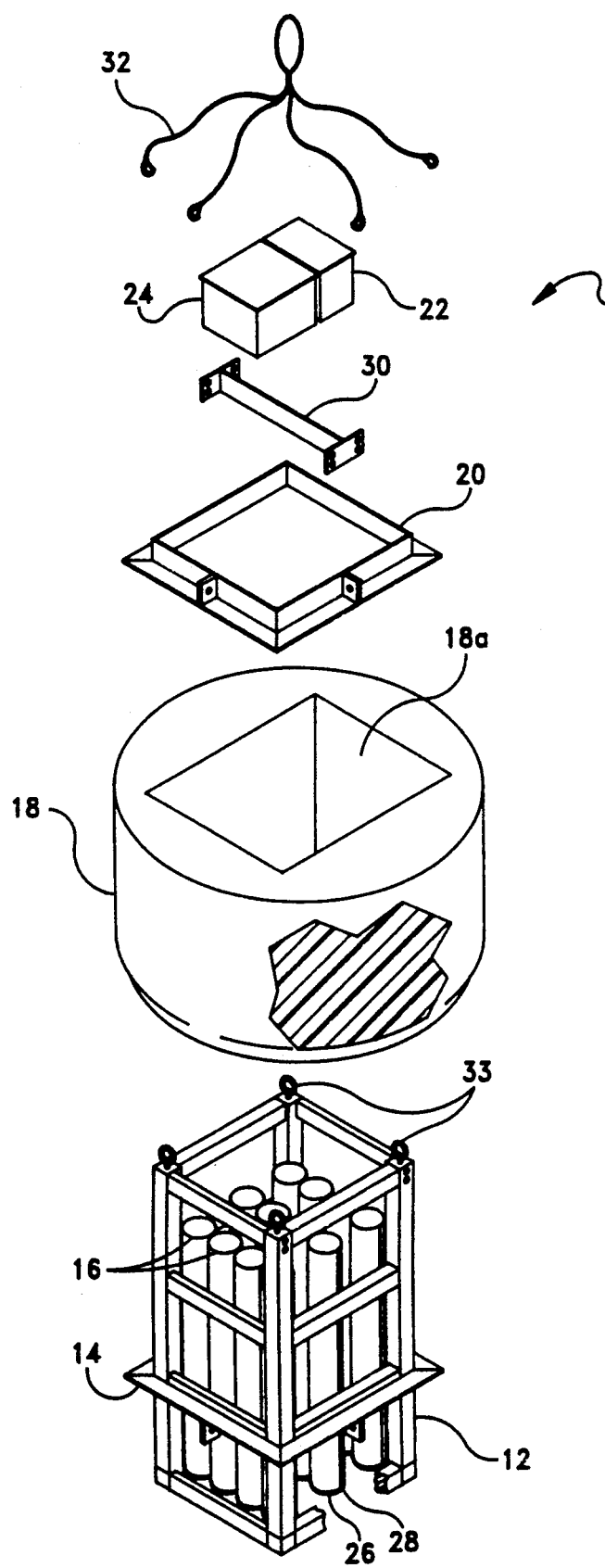
FIG. 1 shows a partially exploded and cut away perspective view of the underwater sound source.

Referring now to FIG. 1 there is shown a partially exploded view of an underwater sound source buoy 10. Underwater sound source buoy 10 comprises a rectangular frame 12 with a lower mounting bracket 14 disposed thereon, a plurality of launch tubes 16, a floatation collar 18, an upper mounting bracket 20, a power supply housing 22, and a control housing 24. Frame 12 is a hollow, rectangular, box shaped frame comprising vertical and horizontal aluminum structural members fixedly attached to each other to form frame 12. Launch tubes 16 are disposed vertically inside frame 12 and affixed thereto using traditional clamping means. Each launch tube 16 is open at the upper end and sealed at the lower end by a hinged door 26. Hinged doors 26 are held shut by burn wires 28 fastening hinged doors 26 to launch tubes 16. Burn wires 28 are preferably 23 AWG music wire insulated with heat shrink tubing that will burn through in two to three seconds when subjected to a 10 A current. Lower mounting bracket 14 is disposed a pre-selected distance below the top of frame 12 and fixed about frame 12 in a horizontal plane. Floatation collar 18 is cylinder shaped with a rectangular aperture 18a passing therethrough along the vertical axis thereof. Aperture 18a provides a clearance fit between floatation collar 18 and frame 12. Floatation collar 18 is placed over frame 12 and rests upon lower mounting bracket 14. Upper mounting bracket 20 is affixed to frame 12 above floatation collar 18 to restrain movement of collar 18 in a vertical direction. An I-shaped bracket 30 is centered and fixed between the uppermost horizontal members of frame 12. Power supply housing 22 and control housing 24 are attached to bracket 30. Control circuitry (not shown) is located within control housing 24, and a power supply (not shown) is located within power supply housing 22. For the preferred configuration, the power supply must provide 12 Volts and a minimum of 10 A. The power supply and the control circuitry are electrically connected to each other, launch tubes 16 and frame 12 in a manner hereinafter described. A lifting harness 32 is connected to eye bolts 33 protruding from the upper surface of frame 12 to allow buoy 10 to be lifted.

In use, buoy 10 is assembled with floatation collar 18 held in place between upper and lower mounting brackets 20 and 14 respectively. Acoustic charges are inserted in launch tubes 16 Buoy 10 is lowered into the water using lifting harness 32. Floatation collar 18 provides buoyancy to support buoy 10 on the surface with the lower ends of launch tubes 16 positioned below the surface of the water.

Figure 2:
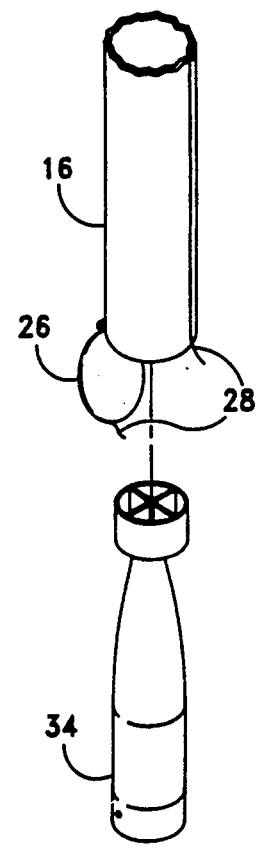
FIG. 2 shows a detail of the burn wire release mechanism of the underwater sound source.

Referring now to FIG. 2 there is shown a detail view of the lower end of a typical launch tube 16. Before deployment of underwater sound source buoy 10, tubes 16 are loaded with acoustic charges 34. Charges 34 have a clearance fit within tubes 16 and are held in place by hinged doors 26 which are retained by burn wires 28. Burn wires 28 are electrically connected to the power supply and the control circuitry. To launch a charge 34, the control circuitry sends an electrical current to the appropriate launch tube 16. The electrical Current causes burn wire 28 to heat and part due to ohmic heating. Hinged door 26 falls open freely and charge 34 is released to fall under the influence of gravity.

Figure 3:
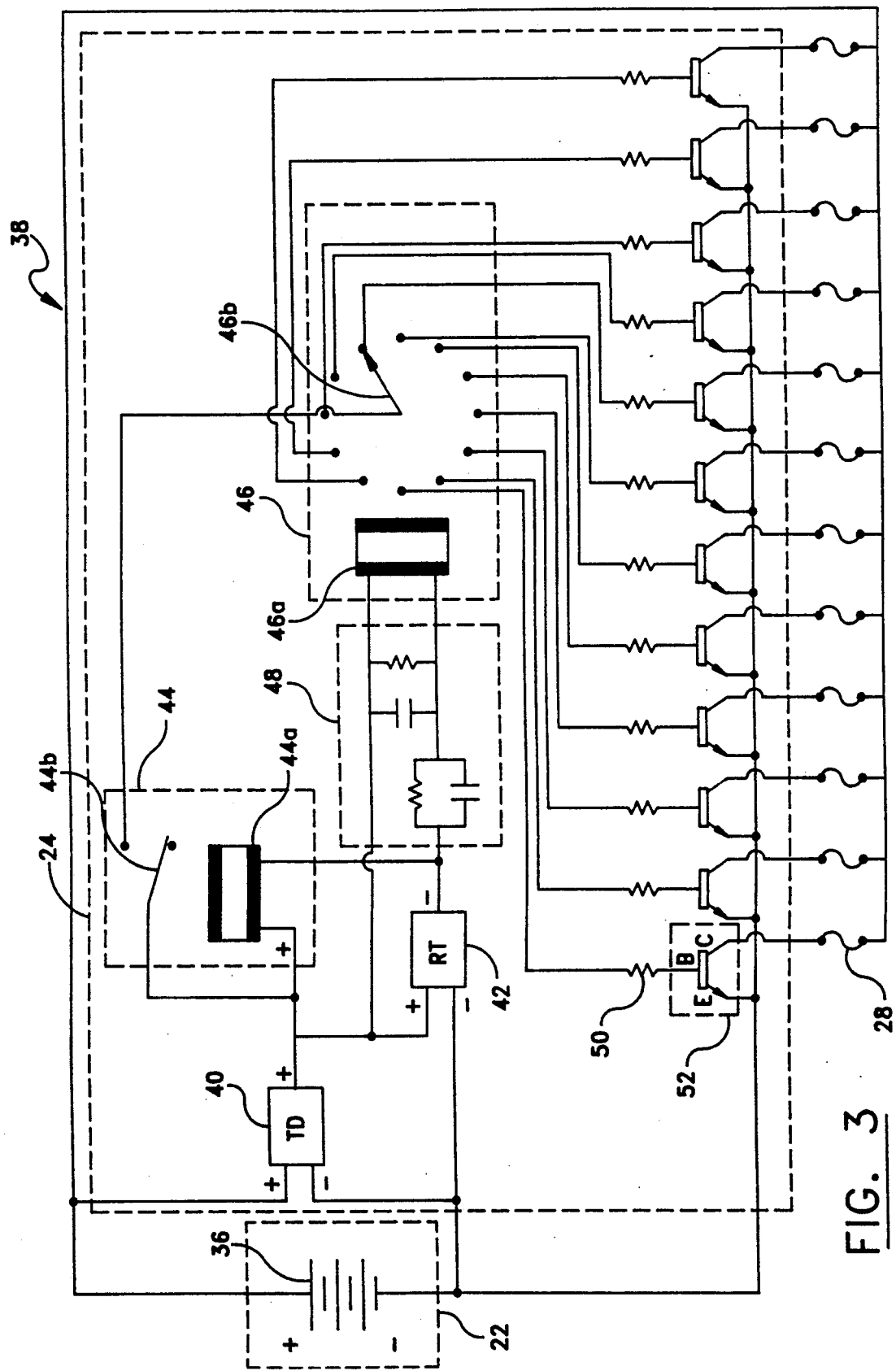
FIG. 3 shows an electrical diagram of the control circuitry of the underwater sound source.

Referring now to FIG. 3, there is shown an electrical wiring diagram of the inventive device. Power supply 36 is positively electrically connected to frame 12. One pole of each burn wire 28 is electrically connected to frame 12. The other pole of each burn wire 28 is electrically connected to said negative terminal of said power supply 36. Control circuitry 38 comprises a time delay relay 40 and a recycle timer 42. Time delay relay 40 is preferred to be any programmable relay similar to the SSAC model TDMH12D Time delay relay, and recycle timer 42 is preferred to be any programmable timer similar to the SSAC model RS1B12 Recycle Timer. Time delay relay 40 is electrically connected to activate the entire circuit after a pre-set programmed delay. Time delay relay 40 and power supply 36 are electrically connected to recycle timer 42 to switch current to recycle timer 42 only after the pre-set programmed delay. A single pole relay 44 having a coil 44a and an armature 44b is electrically connected to recycle timer 42 and time delay relay 40 and twelve pole relay 46. Coil 44a is electrically connected to recycle timer 42 and time delay relay 40 to prevent current from flowing to burn wire 28 until both recycle timer 42 and time delay relay 40 are activated in the closed position. Armature 44b is electrically connected between time delay relay 40 and twelve pole relay 46. Single pole relay 44 can be any single pole relay rated for a voltage of 12 volts and a current of 300 mA. A twelve pole relay 46 having a coil 46a and an armature 46b is electrically connected to recycle timer 42 through a filter 48. Coil 46a is electrically connected to recycle timer 42 to allow armature 46b to switch to the next pole in the sequence each time recycle timer 42 is activated. Twelve pole relay 46 may be any multiple pole relay similar to the Guardian model IR-705-12P-120 twelve pole relay, having a number of poles equal or greater than the number of launch tubes. Filter 48 acts to prevent accidental switching of armature 46b by transient currents. Armature 46b is electrically connected so as to selectively transmit a control voltage from single pole relay armature 44b through a load 50 to the base "B" of one of twelve control transistors 52. Loads 50 prevent damage to transistors 52 due to excess current flow. One end of each burn wire 28 is electrically connected to the collector "C" of a corresponding control transistor 52, and the other end of each burn wire 28 is electrically connected to the other pole of power supply 36. Power supply 36 is electrically connected to the emitter "E" of each control transistor 52.

After the buoy has been deployed, time delay relay 40 is activated after the pre-programmed time has elapsed. Once time delay relay 40 is activated, power can flow to the circuit. Recycle timer 42 begins to cycle. Timer 42 is typically programmed to be on for three seconds and off for five minutes. When timer 42 activates, twelve pole relay 46 selects the next pole in the sequence, and current also flows through single pole relay coil 44a closing armature 44b and allowing current to flow through twelve pole relay armature 46b. Current flowing through twelve pole relay armature 46b then passes through selected load 50 to base "B" of control transistor 52. Once base "B" is saturated, current can pass from one pole of power supply 36 to other pole of power supply 36 through selected burn wire 28. Burn wire 28 melts due to ohmic heating, and a charge is released. After three seconds recycle timer 42 turns off and single pole relay armature 44b switches off.

The advantages of the present invention over the prior art are that this device provides a durable acoustic source which can be deployed from a surface vessel. The surface vessel can then be moved away from the device to avoid acoustic interference. The device will release pressure sensitive, detonation type acoustic charges at pre-set intervals.

What has thus been described is an underwater sound source with timed actuator.

Obviously many modifications and variations of the present invention may become apparent in light of the above teachings. For example: the device could have any number of launch tubes; solenoids could be used to open the hinged doors, the device could be radio controlled, the control circuitry could be digitally controlled, the device could have a safety to prevent accidental discharge of the charges, the charges could be spring loaded to force them from the launch tubes, and the frame could be any shape.

In light of the above, it is therefore understood that within the scope of the appended claims, the invention may be practiced otherwise than as specifically described.

What is claimed is:

1. A buoy for deploying acoustic charges comprising:
   a frame having a plurality of vertical members and a plurality of horizontal members disposed so as to form a rectangular open-sided box having a longitudinal axis;
   a buoyant collar disposed about and affixed to said frame, said buoyant collar providing buoyant force to support the buoy partially above the surface of the ocean in such a way that said longitudinal axis remains substantially vertical;
   a plurality of hollow launch tubes open on the upper and lower ends thereof for holding and launching said acoustic charges, said launch tubes being disposed vertically within said frame;
   a plurality of hinged doors, each of said hinged doors being disposed upon the lower end of each of said launch tubes and hinged to said launch tube at the periphery of the door to allow the door to fall freely from the horizontal position covering the lower end of said launch tube to the vertical position uncovering the lower end of said launch tube;
   a plurality of electrically controllable fastening means, one fastening means being disposed on the lower end of each of said launch tubes, said fastening means retaining said hinged doors in the horizontal position; and
   an electrical control means positioned on the top of said frame, so as to remain above the surface of the ocean when said buoy is deployed, said electrical control means being electrically connected to said fastening means and programmed to cause said fastening means to release each of said hinged doors at preselected times.

2. An apparatus according to claim 1 wherein said electrically controllable fastening means is a burn wire, said burn wire being preselected to part when an electrical current from said electrical control means passes therethrough.

3. An apparatus according to claim 2 wherein said electrical control means further comprises:
   a direct current power supply;
   a time delay relay, having a first and second input and a first output, said first input being electrically connected to one pole of said power supply and said second input being electrically connected to other pole of said power supply, said time delay relay being programmable to activate said electrical control means;
   a recycle timer, having a third and fourth inputs and a second output, said third input being electrically connected to said first output of said time delay relay and said fourth input being electrically connected to said power supply, said recycle timer being programmable to begin cycling between o and off periods upon activation of said first output;
   a single pole relay, having a coil with first and second ends and an armature with a fifth input and a third output, said relay being of the type which allows current to flow through the armature when a second current passes through the coil, said first end of said coil being electrically connected to said second output and said second end of said coil being electrically connected to said first output, and said fifth input being electrically connected to said first output; and
   a multiple pole relay having a coil with third and fourth ends and an armature with a sixth input, said multiple pole relay being of the type wherein an electrical current passing through the coil moves the armature to select one of the poles of said relay, said third end of said coil being electrically connected to said first output and said fourth end of said coil being electrically connected to said recycle timer to move the armature through a sequence of poles, each of said poles being electrically connected to a corresponding burn wire, and said armature of said multiple pole relay being electrically connected to said armature of said single pole relay to conduct a control current through said armature of said multiple pole relay to said selected pole.

4. An apparatus according to claim 3 further comprising an electrical filter means, electrically interposed between said recycle timer and said coil of said multiple pole relay, for preventing transient current fluctuations from moving said armature of said multiple pole relay.

5. An apparatus according to claim 4 further comprising a plurality of transistors, the base of each transistor electrically being connected to one pole of said multiple pole relay, the collector of each transistor electrically being connected to a corresponding one of said burn wires, and the emitter of each transistor electrically connected to the negative pole of said power supply, said transistor allowing current to flow from said collector to said emitter on electrical saturation of said base thereby allowing current to flow through said burn 6. A buoy for deploying acoustic charges comprising:
   a frame having vertical and horizontal members forming a hollow open sided box;
   a lower mounting bracket disposed horizontally about said frame midway up said vertical members of said frame and fixed thereto;
   a buoyant collar positioned with a clearance fit over said frame and resting on said lower mounting bracket, said buoyant collar providing buoyant force to support the buoy partially above the surface of the ocean;
   an upper mounting bracket disposed horizontally about said frame above said buoyant collar and fixed to said frame said upper mounting bracket preventing said buoyant collar from moving in a vertical direction;
   a plurality of hollow launch tubes open on the upper and lower ends thereof for holding and launching said acoustic charges, said launch tubes being disposed vertically within said frame;
   a plurality of hinged doors with each of said hinged doors disposed upon the lower end of each of said launch tubes and hinged to said launch tube at the periphery of the door to allow the door to fall freely from the horizontal position covering the lower end of said launch tube to the vertical position uncovering the lower end of said launch tube; and
   a plurality of burn wires with one burn wire affixed to the lower end of each of said launch tubes and to the periphery of each of said hinged doors, said burn wires retaining said hinged doors in the horizontal position.

7. An apparatus according to claim 6 wherein said electrical control means comprises:
- a power supply;
- a time delay relay electrically connected to said power supply, said time delay relay being programmable to delay activation of said burn wires;
- a recycle timer electrically connected to said time delay relay, said recycle timer being programmable to begin cycling between on and off periods upon activation of said time delay relay;
- a single pole relay having a coil and an armature, said relay being of the type which allows current to flow through the armature when a second current passes through the coil, said coil of said single pole relay being electrically connected to said recycle timer and said time delay relay, and said armature being electrically connected to said time delay relay;
- an electrical filter means electrically connected to said recycle timer and said time delay relay, said filter means acting to reduce transient current fluctuations from said time delay relay and said recycle timer;
- a multiple pole relay having a coil and an armature, said multiple pole relay being of the type wherein an electrical current passing through the coil moves the armature to select one of the poles of said relay, said coil of said multiple pole relay being electrically connected through said filter means to said recycle timer to move said armature through a sequence of poles, and said armature of said multiple pole relay being electrically connected to said armature of said single pole relay to conduct a control current through said armature of said multiple pole relay to said selected pole;
- a plurality of loads with each load electrically connected to a corresponding pole of said multiple pole relay for preventing an excess current from flowing from said multiple pole relay; and
- a plurality of transistors with the base of each transistor electrically connected to one pole of said multiple pole relay through a corresponding one of said loads, the collector of each transistor electrically connected to one of said burn wires, and the emitter of each transistor electrically connected to the negative pole of said power supply, said transistor allowing current to flow from said collector to said emitter on electrical saturation of said base.

* * * * *